April 29, 1952 J. T. BANGERT 2,595,208

TRANSISTOR PULSE DIVIDER

Filed Dec. 29, 1950 3 Sheets-Sheet 1

INVENTOR
J. T. BANGERT
BY
R. O. Covell
ATTORNEY

April 29, 1952 J. T. BANGERT 2,595,208

TRANSISTOR PULSE DIVIDER

Filed Dec. 29, 1950 3 Sheets-Sheet 2

INVENTOR
J. T. BANGERT
BY R. O. Covell
ATTORNEY

April 29, 1952 J. T. BANGERT 2,595,208

TRANSISTOR PULSE DIVIDER

Filed Dec. 29, 1950 3 Sheets-Sheet 3

INVENTOR
J. T. BANGERT
BY R. O. Covell
ATTORNEY

Patented Apr. 29, 1952 2,595,208

UNITED STATES PATENT OFFICE 2,595,208

TRANSISTOR PULSE DIVIDER

John T. Bangert, Summit, N. J., assignor to Bell Telephone Laboratories, Incorporated, New York, N. Y., a corporation of New York Application December 29, 1950, Serial No. 203,307

9 Claims. (Cl. 171—97)

This invention relates to trigger circuits which are herein defined as circuits which have two stable conditions of equilibrium whereat the current and voltage values characteristic of each condition can be made to change from one set of stable values to the other set of stable values in response to an electrical impulse applied to said circuit.

In a second aspect the invention relates to arrangements which utilize a plurality of the aforementioned trigger circuits for binary computations.

An object of this invention is to adapt transistor trigger circuits to respond to voltage impulses of the same polarity applied to a single set of input terminals.

Another object of this invention is to simplify trigger circuits by minimizing the number of components used therein.

Another object of this invention is to simplify binary counters by minimizing the number of components used therein.

As this invention preferably utilizes semiconductor amplifier elements which have been invented recently by others, reference is herein made to many of the important patent applications concerning same and to some of the pertinent theory and characteristics presented therein which will facilitate understanding of the present invention. Application Serial No. 11,165 of John Bardeen and W. H. Brattain, filed February 26, 1948, now abandoned, describes and claims an amplifier unit of novel construction comprising a small block of semiconductor material, such as N-type germanium, with which are associated three electrodes. One of these, known as the base electrode, makes contact with a face of the block. The base electrode may take the form of a plated metal film. The other electrodes, termed emitter and collector, respectively, preferably make rectifier contact with the block. They may, in fact, be point contacts. The emitter is biased to conduct in the forward direction and the collector is biased to conduct in the reverse direction. "Forward" and "reverse" are here used in the sense in which they are understood in the rectifier art. When a signal source is connected between the emitter and the base and a load is connected in the collector circuit, it is found that an amplified replica of the voltage of the signal source appears across the load. The aforementioned application contains detailed directions for the fabrication of the device.

The device may take various forms, all of which have properties which are generally similar although they differ in important secondary respects. Examples of such other forms are described and claimed in an application of J. N. Shive, Serial No. 44,241, filed August 14, 1948, and an application of W. E. Kock and R. L. Wallace, Jr., Serial No. 45,023, filed August 19, 1948, now Patent 2,560,579, granted July 17, 1951. The device in all of its forms has received the appellation Transistor, and will be so designated in the present specification.

In the Bardeen-Brattain application heretofore referred to, there is included a tabulation of the performance characteristics of three sample transistors. In one of these it appears that increments of signal current which flow in the circuit of the collector electrode as a result of the signal current increments which flow in the circuit of the emitter electrode exceed the latter in magnitude. This current amplification feature of transistors has become the general rule, and appears in nearly all transistors fabricated. It is discussed in detail in an application of John Bardeen and W. H. Brattain, Serial No. 33,466, filed June 17, 1948, now Patent 2,524,035, granted October 3, 1950, which is a continuation-in-part of the earlier application of the same inventors. It is of such importance in connection with the present invention, as well as others, that the ratio of these collector circuit current increments to the emitter circuit current increments causing same in a static circuit has been given the symbol $\alpha$, whose value is determined from the static characteristics of the transistor, and in a dynamic circuit $\beta$, whose value is determined from the dynamic characteristics of the transistor.

In the specification which follows, the static current-voltage characteristic curves for a transistor are analyzed. From these static curves a dynamic characteristic for the transistor trigger circuit of this invention is derived. It is shown that when the current amplification factor $\beta$ of the transistor circuit exceeds unity by a sufficient margin and when certain external impedance elements are properly connected and have suitable magnitudes, this dynamic curve has a "negative" resistance portion which is bounded on both sides thereof by "positive" resistance portions. A circuit having this particular dynamic characteristic can be adapted for controlled or controllable instability.

In an application of A. J. Rack, Serial No. 79,861, filed March 5, 1949, it is shown how the domain of instability may be controlled in the design of the transistor network proper and how the domain of actual instability, which may be smaller but is never greater than the theoretical domain, is controlled by adjustment of the load into which the device works and the operating bias potential sources. This prior art teaches that if the emitter circuit load line intersects the dynamic current-voltage characteristic curve of the emitter circuit of a grounded base transistor at the proper point, a "flip-flop" or double-stability trigger circuit is attained with a single transistor element being utilized. However, this trigger circuit is not adapted for use in certain types of electrical systems inasmuch as it is necessary to apply different polarity impulses alternately to the same transistor electrode or to apply the same polarity impulses alternately to the emitter and to the base. For certain circuit applications wherein trigger circuits are used as basic subcomponents such as binary counters, it is desirable to trigger a circuit with the same polarity impulses introduced at the same point. Accordingly, it is a feature of this invention to incorporate a "steering" circuit within the emitter circuit of a grounded base transistor trigger circuit as disclosed by Rack so that an impulse arriving, when the trigger circuit is at one condition of equilibrium, will be steered to the electrode which controls the triggering, while an impulse arriving when the trigger circuit is at the other condition of equilibrium, will be steered to the other electrode.

In a broad qualitative sense the mode of operation of the basic trigger circuit of Rack is as follows: Given a transistor whose curent amplification $\beta$ can under proper bias conditions exceed unity by a sufficient margin, and given a bias potential source which applies these conditions, then the external collector current substantially exceeds the emitter current which gives rise to it. The transistor electrodes being interconnected by way of an external circuit, a part of the collector current is fed back to the emitter in proper phase to increase the emitter current originally introduced thus giving rise to regeneration.

As soon, however, as the positive or regenerative feedback current commences to flow, the transistor operating conditions are altered. This alteration soon carries the operating conditions into a domain in which the current amplification no longer exceeds unity by a sufficient margin to maintain the feedback. Such a domain is stable. In general, there are two stable domains, one on either side of the unstable domain, and the transistor proceeds from one stable domain to the other stable domain in response to a single input impulse. The circuit remains there unless it receives another impulse of different polarity whereupon it assumes the original stable condition.

Transistor networks which are adjusted to exhibit negative resistance characteristics fall into two main classes as is set forth in the aforementioned application of Rack. The first class comprises networks of the voltage controlled or short-circuit stable type, and is exemplified by a transistor network of the grounded emitter configuration. The operation of this network is best explained in terms of $\alpha$, the static transistor current amplification factor. The second class of negative resistance transistor networks of which this specification is particularly concerned comprises those of the current controlled or open-circuited stable type. Networks of this class are exemplified by a transistor network of grounded base configuration having an external impedance element connected in series with its base electrode. The impedance of this element plays an important part in the operation, which is best explained, not in terms of $\alpha$, but in terms of $\beta$, the dynamic current ratio for the transistor network as a whole which is a function of $\alpha$ and of the external impedances of the network. For further information concerning the two classes of negative resistance and their distinguishing characteristics reference is herein made to "Negative Impedances and the Twin 21-Type Repeater" by G. Crisson, published in the Bell System Technical Journal, July 1931.

The "steering" circuit feature of this invention, which enables successive impulses of the same polarity to trigger the basic circuit of Rack, comprises a variable resistance element connected to a transistor emitter circuit in such a manner that the element assumes different resistance values for the two conditions of stable equilibrium of the trigger circuit, the apparent resistance values thereof effectively translating a sequence of input impulses of the same polarity to a sequence of impulses of alternating polarity thereby enabling triggering of the transistor emitter circuit by impulses of the same polarity. As a consequence thereof, a plurality of trigger circuits including steering components can be connected in tandem to provide a binary counter for a sequence of input impulses of the same polarity.

In order that the operation of this invention may be clearly understood, reference is herein made to the drawings wherein.

Figure 1:
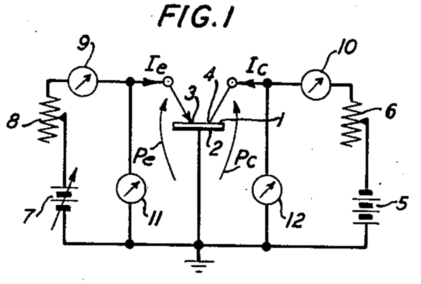
Fig. 1 is a schematic circuit diagram of apparatus for determining the static characteristics of a transistor.

Referring now to the drawings, Fig. 1 shows a transistor network of the grounded base configuration. The transistor itself comprises a block 1 of semiconductor material such as, for example, the high back voltage germanium prepared in the manner described in "The Transistor, a Semiconductor Triode" by J. Bardeen and W. H. Brattain, published in the Physical Review, volume 74, page 230, July 15, 1948. Block 1 has a low resistance base electrode 2 in contact with one face thereof, and two point contact electrodes in a closely spaced relationship with respect to one another engaging the opposite face. Contact 3 designated by the arrowhead is the emitter and the nearby contact 4 is the collector. As fully described in the aforementioned applications of John Bardeen and W. H. Brattain, the transistor gives the greatest amount of amplification, especially current amplification, when emitter electrode 3 is biased positively with respect to base 2 by a fraction of a volt and collector 4 is biased negatively with respect to base 2 by 40 to 100 volts. In the figure, battery 5 supplies the large negative bias to the collector by way of an adjustable resistor 6, while battery 7 supplies the smaller positive bias to the emitter by way of adjustable resistor 8. Milliammeters 9 and 10, connected in series with the emitter and the collector, respectively, determine the magnitudes of the emitter and collector currents; whereas, voltmeters 11 and 12 connected from the emitter to the base and from the collector to the base, respectively determine the corresponding voltages.

By varying the electrode potentials, as by adjusting resistors 6 and 8 to different values, it is possible to obtain numerous data on the transistor. Each datum comprises four quantities, namely, emitter current, emitter voltage, collector current and collector voltage; and these four quantities, taken together, completely define one single condition of transistor operation.

It is convenient from the standpoint of what follows to plot these data in the form of two families of curves. In the first family, represented by the solid curves of Fig. 2, each curve represents the collector current $I_c$ as a function of the collector voltage $P_c$, the emitter current $I_e$ being held constant along the curve and differing from curve to curve. In the second family, represented by the broken curves, each curve represents the collector current $I_c$ as a function of collector voltage $P_c$, the emitter voltage $P_e$ being maintained constant along the curve and differing from curve to curve. Following established conventions, transistor electrode currents are in each case taken as positive when flowing into the transistor from the external circuit, and voltages are taken as positive when measured from the base to the emitter or to the collector as the case may be. Hence, since in operation the collector bias voltage is negative and current flows out of the transistor, the curves of both families lie in the third quadrant of the figure.

Figure 3:
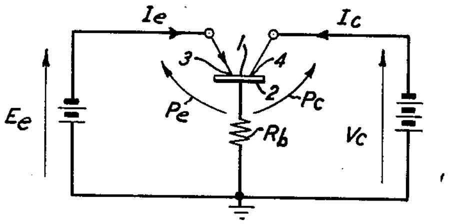
Fig. 3 is a schematic circuit diagram of a transistor network of the grounded base configuration arranged to exhibit negative resistance characteristics.

This invention pertains in the main to transistor networks of the open circuit stable class which are realized electrically by transistor networks of the grounded base configuration shown in Fig. 3. Introducing the symbols $E_e$ and $V_c$ for the voltage from ground to emitter and from ground to collector, respectively, the relation between the currents and voltages may be written at once from well-known principles of circuit analysis as follows:

$$E_e=P_e+(I_e+I_c)R_b \quad (4)$$

$$V_c=P_c+(I_e+I_c)R_b \quad (5)$$

or $$P_c+I_cR_b=V_c-I_eR_b \quad (5a)$$

The relation between $E_e$ and $I_e$ may now be obtained in the following manner. An arbitrary value of collector-to-ground voltage $V_c$ and a sufficiently large value of the base resistor $R_b$ are first selected. These are to remain fixed throughout the ensuing graphical construction process. Next, a first working value of $I_e$ is selected, and the quantity $$V_c-I_eR_b$$

is computed. From Equation 5a, this is a value of $P_c$ when $I_c=0$, and therefore it establishes a point on the $P_c$ axis of Fig. 2. Through this point, a line is drawn having the slope $R_b$. This line intersects the solid (constant $I_e$) curve whose value of $I_e$ is the assumed one. This intersection establishes a point in the $I_c-P_c$ plane. $I_c$ is read off as the abscissa of this intersection point, while $P_e$ is obtained from the broken curve which passes through the intersection point. Now that $I_c$ and $P_e$ have been determined, they are used, along with the assumed value of $I_e$, to determine $E_e$ from Equation 4. Repetition of this process for different assumed values of $I_e$, always holding $V_c$ and $R_b$ fixed, gives a set of paired values of $E_e$ and $I_e$.

Figure 4:
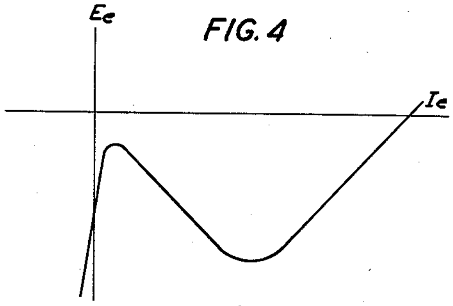
Fig. 4 is a dynamic current-voltage characteristic of the emitter circuit of the transistor network of Fig. 3.

These paired values are now plotted, one against the other, and for most transistors this plot has the form shown in Fig. 4. From its shape it is termed an "N" curve, and it represents the dynamic emitter-to-ground characteristic of the transistor network of Fig. 3. It will be observed that in this curve, the portion which lies between the upper peak and the lower peak has a negative slope, which represents a negative resistance of the transistor network. Throughout this region the curve shows that the emitter current $I_e$ is a three-valued function of the emitter voltage $E_e$. For example, for a single value of the emitter voltage $E_e$ represented by a horizontal line, there correspond three distinct and separate values of current of which the first and third are stable values, while the second value is unstable.

The dynamic characteristic of the transistor network of Fig. 3, which is shown in Fig. 4, contains a negative resistance portion only when the transistor itself is one whose dynamic current amplification factor exceeds unity. This restriction will be understood from the following analysis.

Rewriting Equation 4 for small changes in the variables, there results $$\Delta E_e = \Delta P_e + (\Delta I_e + \Delta I_c) R_b \quad (6)$$

Figure 2:
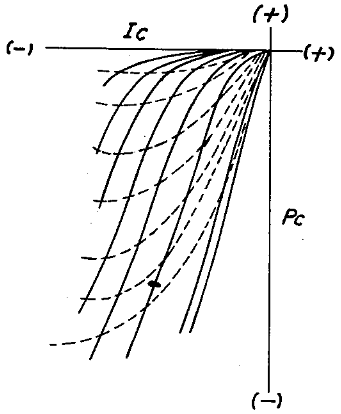
Fig. 2 is a family of transistor static characteristics.

Examination of the static curves of Fig. 2 shows that for a positive increment $\Delta I_e$ the increment $\Delta P_c$ is also positive, while the increment $\Delta I_c$ is negative throughout the region corresponding to the negative resistance part of Fig. 4. Hence, taking absolute values, Equation 4 becomes $$\Delta E_e = |\Delta P_e| + \{|\Delta I_e| - |\Delta I_c|\} R_b \quad (7)$$

Dividing this equation by $\Delta I_e$, and introducing the definitions $$\frac{\Delta I_c}{\Delta I_e} = \beta \text{ (current ratio)}$$

$$\frac{\Delta E_e}{\Delta I_e} = R_o \text{ (input resistance of the network of Fig. 3)}$$

there is obtained the relation $$R_o = \left|\frac{\Delta P_e}{\Delta I_e}\right| + (1-\beta) R_b \quad (8)$$

As pointed out above, $\Delta P_e$ and $\Delta I_e$ are always of the same sign so that the first term is always positive. Therefore, if the input resistance $R_o$ is to be negative, the second term must be negative and must more than offset the first; i. e., $$(\beta - 1) R_b \geq \left|\frac{\Delta P_e}{\Delta I_e}\right| \quad (9)$$

or $$R_b \geq \frac{1}{\beta - 1}\left|\frac{\Delta P_e}{\Delta I_e}\right| \quad (10)$$

Equations 9 and 10 reveal certain essential design criteria for attaining negative resistance in the emitter circuit of a grounded base transistor circuit, which is characterized by an impedance element $R_b$ connected between base and ground and said impedance element being common to both the emitter and the collector circuits. Specifically, $\beta$ must be greater than 1, the amount greater depending on the values of $R_b$ and $$\left|\frac{\Delta P_e}{\Delta I_e}\right|$$

$R_b$ should preferably have a large resistance value, and the quantity $$\left|\frac{\Delta P_e}{\Delta I_e}\right|$$

which is the emitter to base resistance, should preferably have a small value.

Figure 5:
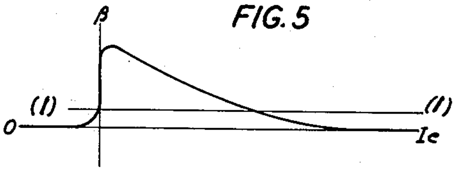
Fig. 5 is a graphical representation of the current amplification factor $\beta$ of the network of Fig. 3 for various emitter circuit current values.
Figures 6, 8:
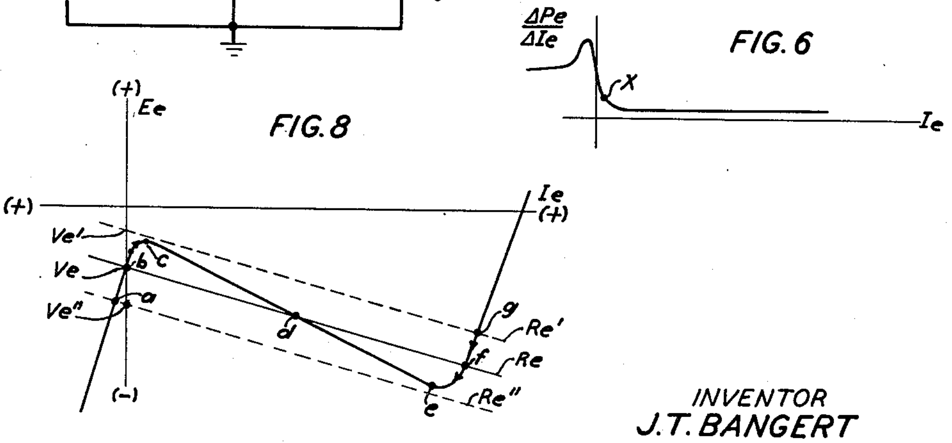
Fig. 6 is a graphical representation of the emitter to base resistance of the network of Fig. 3 for various emitter circuit current values.
Fig. 8 is a diagram of assistance in explaining the operation of the circuit configuration of Fig. 7.

From an analysis of Fig. 5, which plots the variation in the amplitude of $\beta$ along the vertical axis for different emitter current values for a typical set of circuit values including $R_b$ resistance, $\beta$ is negligible for negative emitter currents and attains a value greater than 1 for a portion of the positive emitter current region. As is shown in Fig. 6, the emitter to base resistance $$\left|\frac{\Delta P_e}{\Delta I_e}\right|$$

is large for negative emitter currents; whereas, for positive emitter currents the emitter to base resistance is negligible.

The validity of Equations 9 and 10 is thus checked empirically for from Fig. 4 the emitter circuit of a transistor presents a negative resistance between emitter and ground for positive values of emitter current.

Figure 7:
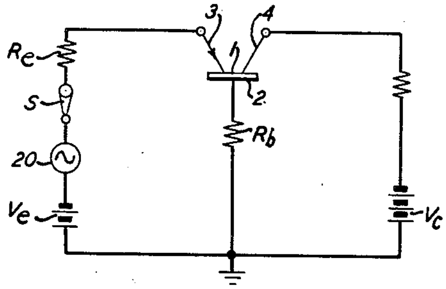
Fig. 7 is a schematic circuit diagram of a double-stability or "flip-flop" trigger circuit modification of Fig. 3.

Once a transistor network has been constructed whose dynamic characteristic has the form shown in Fig. 4, it is possible to put it to use in various ways. Suppose, as is shown in Fig. 7, that a series combination including a resistor $R_e$, a switch S, an alternating-current potential source 20, and a direct-current potential source $V_e$ is connected between emitter 3 and ground. To depict the performance of this network, the curve of Fig. 4 has been duplicated in Fig. 8, and a load line of slope $R_e$ has been drawn to represent the effect of the external resistor $R_e$. With suitably chosen values of voltage for source $V_e$ and of resistance for resistor $R_e$, the $R_e$ load line intersects the dynamic characteristic *abcdefg* at its negative resistance portion, as at point *d*. At point *d* the negative resistance value specified by the slope of the dynamic characteristic exceeds the positive resistance specified by the slope of the load line; therefore, point *d* represents an operating point of unstable equilibrium. Intersection points *b* and *f* represent operating point of stable equilibrium inasmuch as the dynamic characteristic is positive in value.

If a positive pulse is momentarily applied by source 20, thereby introducing a series opposing potential to the potential of $V_e$ so that the sum thereof is $V_e'$, a second load line $R_e'$ should be drawn with respect to curve *abcdefg* which intersects the positive resistance portion of the curve at point *g*. The maximum amplitude of this opposing potential from source 20 should be great enough to cause the load line $R_e'$ to pass above point *c*. With this condition the current of the emitter circuit follows the path from *b* to *c*, and at point *c* snaps to point *g* instantaneously. When the pulse from source 20 diminishes in amplitude, the emitter current follows the path from *g* to *f* as indicated by the arrow. Point *f* is a point of stable equilibrium and the emitter circuit current and voltage remain there until a pulse from source 20 shifts the load line again.

If a second negative pulse is now applied to the emitter circuit by source 20 so as to be in a series aiding relationship with the potential of sourve $V_e'$, the load line $R_e$ shifts downward and assumes the position $R_e''$ at the peak of the pulse from source 20. Specifically, the current in the emitter circuit travels from point *f* to point *e* as indicated by the arrow and then snaps to point *a*. Again the amplitude of the pulse from source 20 should be great enough to cause the load line $R_e''$ to fall below point *e*, this condition being essential to cause the current to snap from point *e* to point *a*. As the impulse from source 20 diminishes in amplitude the current in the emitter circuit passes from point *a* to point *b*, a point of positive equilibrium.

The circuit of Fig. 7 is, therefore, a trigger circuit with two points of stable equilibrium, *b* and *f* of Fig. 8, said circuit being capable of alternately assuming those points in response to alternate polarity pulses being applied to the transistor emitter circuit, or alternately applying the same polarity potential with respect to ground to the emitter and then to the base. These requirements make the circuit of Fig. 7 inapplicable in certain circuit applications wherein the triggering pulses are usually of the same polarity as, for example, binary counters.

Figure 9:
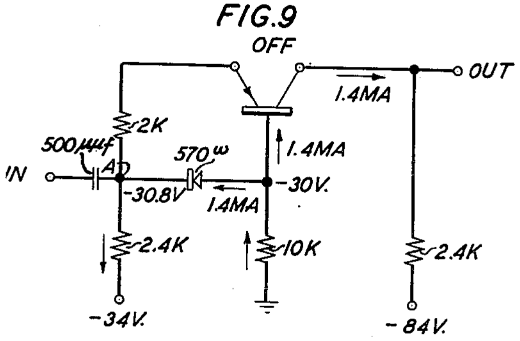
Fig. 9 is a schematic diagram of the steering circuit of this invention incorporated in the circuit of Fig. 3, the current, voltage and component values listed therein being characteristic of one point of stable operation of the combination.
Figure 9A:
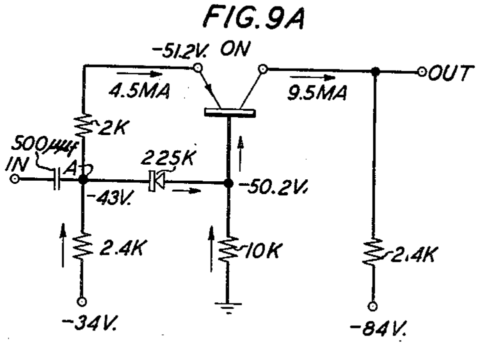
Fig. 9A is schematically the same circuit shown in Fig. 9 with the current, voltage and component values listed therein being characteristic of the second point of stable operation of the circuit of Fig. 9.

There is shown in Figs. 9 and 9A a schematic diagram of a trigger circuit having a dynamic negative resistance characteristic. The circuit includes, however, components to attain effective steering of a sequence of input impulses of the same polarity so that the requirement of the basic trigger circuit shown in Fig. 7, that is, the impulses be alternately positive and negative with respect to ground, may be overcome.

Specifically, Fig. 9 shows the circuit and its current, voltage and component values when the circuit is in its "off condition," which is indicated graphically by point *b* of Fig. 8. Fig. 9A shows the same circuit and its current, voltage and component values when the circuit is in its "on condition," which is indicated graphically by point *f* of Fig. 8.

In Figs. 9 and 9A a series resistor of 2000 ohms is connected between the emitter and common junction A. This junction is biased negatively through a 2400-ohm resistor which serves as a load for an incoming impulse. Point A is connected to the base through a variable resistance element commonly known as a "varistor," said element being poled so that positive current will flow easily in the direction of the arrow. An input impulse source, not shown, which should be connected between the In terminal and ground, is coupled to point A by a small value capacitor. A 2400-ohm resistor is connected in the collector circuit to develop an output impulse and to provide an output isolated from the 10,000-ohm base resistor.

In the "off condition" the base is slightly less negative than point A so that the variable resistance element is conducting 1.4 milliamperes and has a 570-ohm resistance value, which is somewhat less than the 2000-ohm emitter series resistance. The emitter current which flows in the "on condition" is preferably great enough in the positive or forward direction to cause the emitter to base resistance to become negligible. The amount of positive emitter current flow should preferably be great enough to carry the emitter to base resistance to the low values to the right of point *x* of Fig. 6. In the "on condition" both the base and point A have become more negative, but the change in the base potential is larger than that of the emitter so that it is now more negative than point A. This change in relative potentials renders the variable resistance element practically non-conducting and the element therefore assumes a resistance value in the neighborhood of 225,000 ohms, which is large compared with the 2000-ohm emitter series resistor. In general, when the transistor emitter circuit current is small the variable resistance element current is large and vice versa.

The detailed operation of the circuit starting from the "off condition" of Fig. 9 is as follows: With the emitter circuit current and voltage values being at one point of stable equilibrium, namely *b* of Fig. 8, a negative impulse with respect to ground is applied between the In terminal of Fig. 9 and ground. The impulse divides at point A so that a portion thereof acts on the base and a different amplitude portion thereof acts on the emitter thereby momentarily driving the emitter positive with respect to the base. Graphically speaking, the division of the negative input pulse in this manner shifts the load line upwards to the new $R_e'$ value shown in Fig. 8. As the input impulse diminishes in amplitude, the load line shifts from the $R_e'$ position of Fig. 8 to the original position indicated by $R_e$ causing the circuit to assume current and voltage values characteristic of the second point of equilibrium or point *f* of Fig. 8. The circuit component, current and voltage value of point *f* or the "on condition" are shown in Fig. 9A.

From a second aspect, with the application of the first negative impulse to the In terminal when the circuit is in the "off condition," the voltage divider network comprising the 2000-ohm resistor and the emitter to base resistance in series therewith, the combination thereof being in parallel with the 570-ohm variable resistance element, and the parallel combination thereof being connected to ground through a 10,000-ohm resistor, causes the emitter to become positive with respect to the base; therefore, the emitter begins to conduct greater current. At this point the $\beta$ or current gain is large so that more current flows in the collector circuit than in the emitter circuit. Because the emitter and collector currents flow in opposite directions in the 10,000-ohm base resistor, the larger collector current flowing from ground to base causes the base to become more negative. This is in the same direction as the impulse which initiated the action, so that the process continues until emitter current increments are just balanced by collector current increments or the current gain is unity whereat the second condition of equilibrium is reached.

The second negative pulse applied between the In terminal and ground is effectively barred by the high resistance value of the variable resistance element so that the impulse acts principally on the emitter to reduce the emitter current. The load line shifts from the $R_e$ value of Fig. 8 to the $R_e''$ value at the maximum potential amplitude of the applied negative pulse. As the negative input impulse diminishes in amplitude the load line shifts to the $R_e$ position of Fig. 8 thereby causing the circuit to assume values characteristic of the starting point of equilibrium at point *b*.

In a further aspect the second negative pulse applied between the In terminal and ground reduces the emitter current which causes an even larger reduction in the collector current. The voltage drop across the 10,000-ohm base resistor is thereby decreased, making the base less negative or the emitter more negative. This action continues until the emitter current attains the low current stable value or "off condition." Thus, the circuit changes state every time a negative pulse is applied between the In terminal and ground.

As is shown in Fig. 9 the collector is at −81 volts in the "off condition," and as is shown in Fig. 9A the collector is at −61 volts in the "on condition." Hence the output is a substantially square wave of 20 volts amplitude, with the duration depending on the repetition rate of the triggering input pulses. Two different potential biases are supplied in the circuit of Figs. 9 and 9A; one to the emitter and one to the collector. The collector bias is non-critical and can be set to any value over a wide range. The emitter bias depends on the value selected for the collector bias and is fairly critical with an allowable tolerance of about ten percent. In general its value must be determined by the emitter circuit load resistance value. The emitter bias must locate the load line on the dynamic characteristic so that the negative resistance portion thereof is intersected by the load line. The input pulse should preferably be of the order of 10 volts and can be as short as one microsecond duration.

Figure 10:
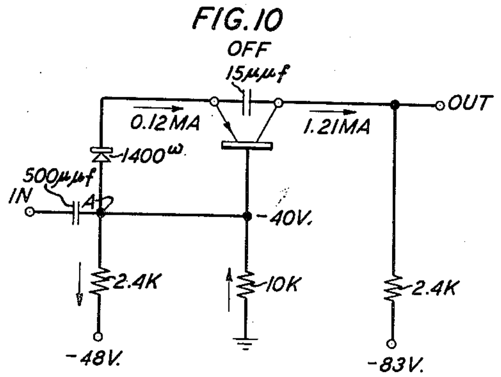
Fig. 10 shows a modified version of the steering circuit of this invention incorporated in the basic circuit of Fig. 3, the current, voltage, and component values listed therein being characteristic of one point of stable operation of the combination.
Figure 10A:
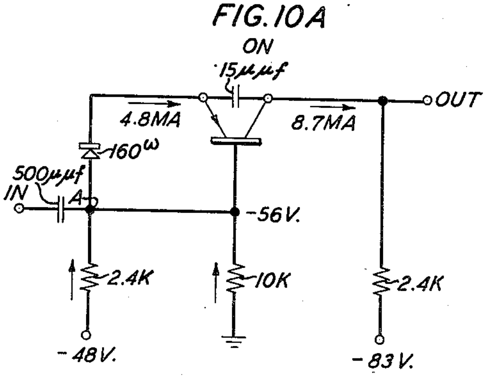
Fig. 10A is the same circuit schematically shown in Fig. 10 with the current, voltage, and component values listed therein being characteristic of the second point of operation of the circuit of Fig. 10.

A second trigger circuit is shown in Figs. 10 and 10A. This circuit is a modification of the trigger circuit of Figs. 9 and 9A. Specifically, the variable resistance steering element is connected directly across the transistor terminals so that the two components might be packaged as a unit. In this modified arrangement there is no resistance element between point A and the base, and the variable resistance steering element is connected between point A and the emitter.

In the "off condition," that is, with transistor operation at point *b* of Fig. 8, the variable resistance steering element assumes a resistance value of 1400 ohms. With the application of the first negative impulse between the In terminal and ground, the base assumes the full negative value; whereas, the potential drop across the variable resistance steering element causes the emitter to assume a positive potential with respect to the base. This positive impulse between emitter and base causes the circuit to transfer voltage and current values to the "on condition" or to point *f* of Fig. 8. This transfer occurs in the same general manner as the "off" to "on condition" transfer occurs in the circuit of Figs. 9 and 9A. In the "on condition" there is practically no resistance between A and the base or emitter. Hence, a second negative input impulse lowers the potential of both the emitter and base substantially an equal amount. This is the same as making the collector more positive with respect to the base. Because the collector is only approximately 6 volts more than the base in the "on condition" it requires only a small positive pulse to reduce the collector current to zero which brings about the "off condition."

A capacitor of the order of 15 micromicrofarads is connected between the emitter and the collector for the purpose of increasing the transient feedback without increasing the value of the base resistor from the 10,000-ohm value. This capacitor is not needed for all transistor units but tends to increase the number of operable units in a given circuit.

The particular type of transistors used in the circuits of Figs. 9 and 9A and Figs. 10 and 10A are the A1698 units manufactured by the Western Electric Company. However, it is to be clearly understood that other types of transistors known in the prior art will operate satisfactorily in the circuit of this invention. In general, an essential requirement of the transistor used is that it have an $\alpha$ or $\beta$ greater than one.

The trigger circuits of Figs. 9 and 9A and Figs. 10 and 10A may also be considered single stage counting circuits. By connecting suitable output means to the Out terminals of said circuits an indication or registration may be made to appear for every two input pulses. Practical counter circuits usually require, however, a greater scale down than 2 to 1. Accordingly, in Fig. 11 there is shown two stages of the trigger circuit of Figs. 9 and 9A connected in tandem by a suitable coupling arrangement; and in Fig. 12 there is shown two stages of the trigger circuit of Figs. 10 and 10A connected in tandem by the same coupling arrangement shown in Fig. 11.

Figure 11:
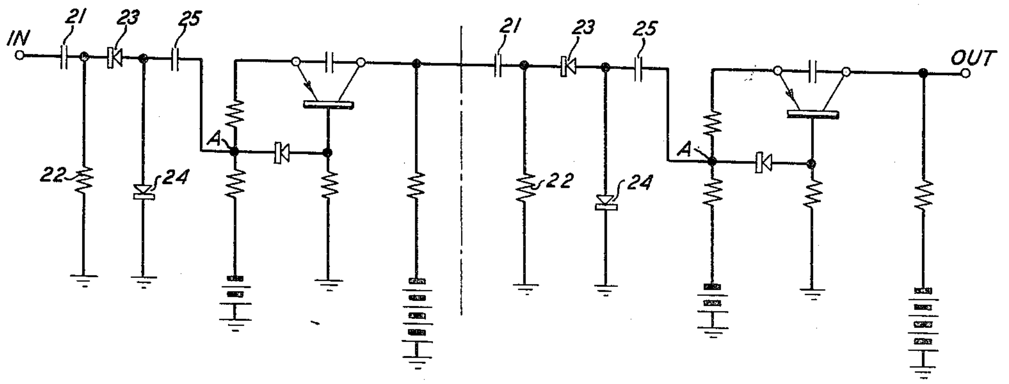
Fig. 11 is a two-stage binary counter employing the basic circuit of Figs. 9 and 9A.
Figure 12:
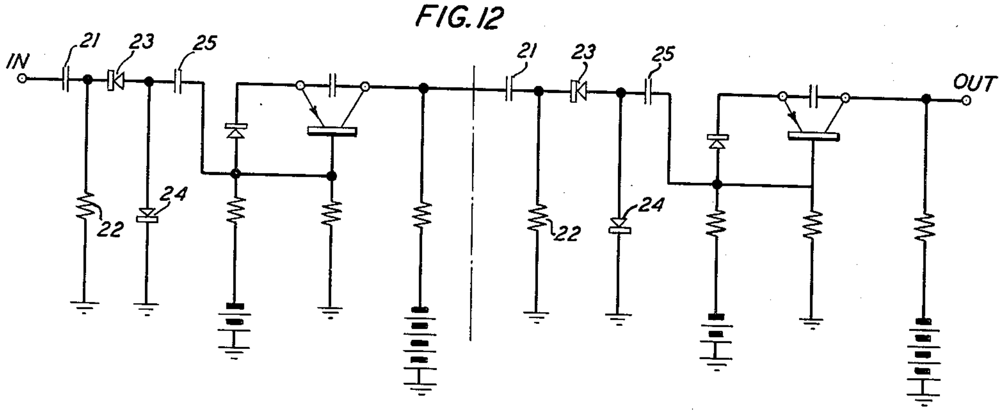
Fig. 12 is a two-stage binary counter employing the basic circuit of Figs. 10 and 10A.
Figure 13:
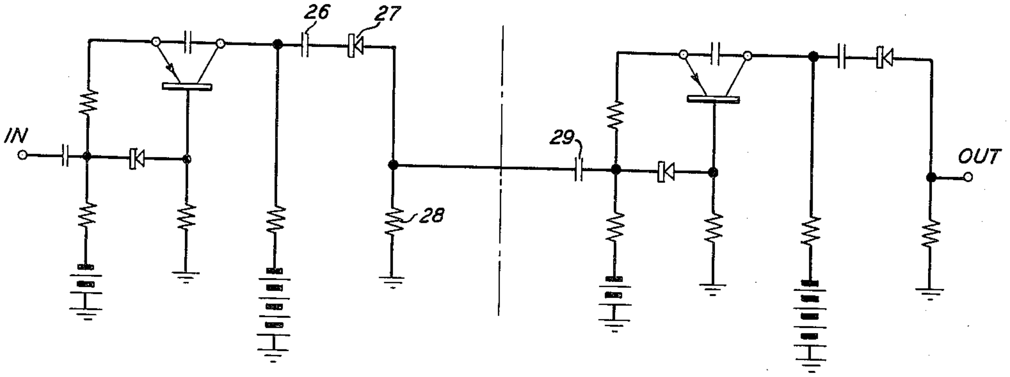
Fig. 13 is a two-stage binary counter employing the basic circuit of Figs. 9 and 9A but utilizing, however, a different coupling arrangement than that shown in Fig. 11.
Figure 14:
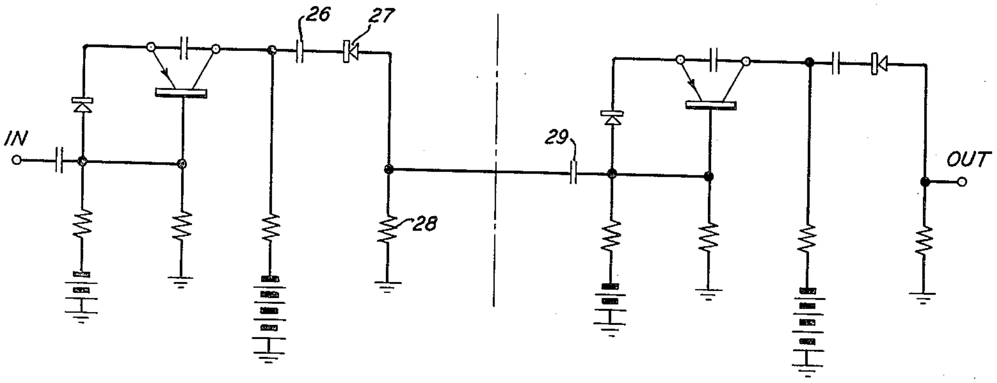
Fig. 14 is a two-stage binary counter employing the basic circuit of Figs. 10 and 10A but utilizing, however, a different coupling arrangement than that shown in Fig. 12.

Since the output voltage of the basic trigger circuit is essentially a square wave; whereas, the inputs thereof are designed to operate in response to pulses, the coupling network must provide suitable conversion. Referring to Figs. 11 and 12, capacitors 21 and their respective shunt resistors 22 produce alternate positive and negative pulses by differentiating the square wave appearing between the preceding collector and ground. Since the basic counting stage trips on either polarity of input pulse, it is necessary to discriminate against one or the other to secure impulse dividing action. Inasmuch as the basic circuit usually trips on lower value negative pulses than positive pulses, varistors 23 and 24 connected as an L section, offer a high series impedance and a low shunt impedance, respectively, to positive pulses. Capacitor 25 serves only to provide the proper direct-current bias at point A. A simpler coupling circuit applied to the basic circuits of Figs. 9 and 9A and Figs. 10 and 10A is shown in Figs. 13 and 14, respectively. Varistor 27 is connected in series in the differentiating circuit which includes capacitor 26 and resistor 28. This series arrangement presents an extremely high impedance to positive pulses. Capacitor 29 serves only to provide the proper direct-current bias at point A.

The circuit component values and types herein specified are illustrative of practical values and types which may be used in the circuit embodiment set forth in the drawing. It is to be understood, however, that the above-described arrangements are illustrative of the application of the principles of this invention. Numerous other arrangements may be devised by those skilled in the art to which this invention pertains without departing from the scope thereof.

What is claimed is:

1. An electrical trigger circuit which comprises a transistor having a semiconductive body and a base electrode, an emitter electrode, and a collector electrode in operating contact with said body, said transistor being characterized by a ratio of short circuit collector current to emitter current which substantially exceeds unity for electrode current-voltage conditions within a preassigned range, an external network interconnecting said electrodes and including a potential source for establishing current-voltage conditions within said range, said network comprising a current path by way of which current is regeneratively fed back from the collector to the emitter in amount sufficient to give rise to a negative variational resistance characteristic within said range, said network also including an impedance element which is operative to determine the extent of said range, and a steering network connected to said emitter and base electrodes for translating a sequence of input impulses of the same polarity to impulses of alternate polarity to be applied to said electrodes, whereby said trigger circuit is caused to alternate between stable operating conditions in response to said input impulses.

2. Apparatus as defined in claim 1 wherein the external interconnecting network is of the grounded base configuration and a current feedback promoting resistor is connected in series with the base of a transistor.

3. An electrical trigger circuit which comprises a transistor having a semiconductive body and a base electrode, an emitter electrode and a collector electrode in operative contact with said body, said transistor being characterized by a ratio of short circuit collector current to emitter current which substantially exceeds unity for electrode current-voltage conditions within a preassigned range, an external network interconnecting said electrodes and including a potential source for establishing current-voltage conditions within said range, said network comprising a current path by way of which current is regeneratively fed back from the collector to the emitter in amount sufficient to give rise to a variation of resistance characteristic which is negative within said range and positive outside of said range, said network also including a positive impedance whose characteristic intersects said variation of resistance characteristic at three points, of which the outer ones represent stable domains of operation while the inner one represents an unstable domain of operation, a steering network including a variational resistance element for translating a sequence of impulses of the same polarity to a sequence of impulses of opposite polarity, said steering network being connected between said base and emitter electrodes, and means for applying a sequence of impulses of the same polarity to said steering network thereby driving said trigger circuit from one of its stable domains toward said unstable domain, whereby its operation is caused to snap from one of said stable domains to the other in response to a sequence of impulses of the same polarity.

4. In combination, a transistor including base, collector and emitter elements, an emitter circuit characterized by a negative impedance over a portion of its operative range, and a steering network including a variable resistance element connected to said emitter circuit whereby said trigger circuit may be caused to alternate between equilibrium operational points in response to successive input impulses of the same polarity.

5. Apparatus as defined in claim 4 wherein said variable resistance element is characterized by a positive current coefficient of resistance whose resistance value varies in response to said successive input impulses of the same polarity whereby said emitter is alternately driven positively and negatively with respect to the base in response to said input impulses.

6. An electrical trigger circuit which comprises a transistor having a semiconductive body and a base electrode, an emitter electrode and a collector electrode in operating contact with said body, said transistor being characterized by a ratio of short circuit collector current to emitter current which substantially exceeds unity for electrode current-voltage conditions within a preassigned range, an external network interconnecting said electrodes and including a potential source for establishing current-voltage conditions within said range, said network comprising a current path by way of which current is regeneratively fed back from the collector to the emitter in amount sufficient to give rise to a negative variational resistance characteristic within said range, said network also including an impedance element which is operated to determine the extent of said range, a steering network including a resistor and a variable resistance element in series with respect to one another, said series subcombination being connected between said emitter and base electrodes, and an input potential source for applying impulses of the same polarity between the junction of said resistor and said variable resistance element and ground whereby said trigger circuit is caused to alternate between stable operating conditions in response to a succession of said input impulses.

7. An electrical trigger circuit which comprises a transistor having a semiconductive body and a base electrode, an emitter electrode and a collector electrode in operating contact with said body, said transistor being characterized by a ratio of short circuit collector current to emitter current which substantially exceeds unity for electrode current-voltage conditions within a preassigned range, an external network interconnecting said electrodes and including a potential source for establishing current-voltage conditions within said range, said network comprising a current path by way of which current is regeneratively fed back from the collector to the emitter in amount sufficient to give rise to a negative variational resistance characteristic within said range, said network also including an impedance element which is operative to determine the extent of said range, a steering network including a variable resistance element connected directly between said emitter and said base electrodes, and an input impulse source for applying impulses of the same polarity to said emitter circuit whereby said variable resistance element translates said sequence of input impulses of the same polarity to impulses of alternate polarity thereby triggering said circuit to alternate stable operating points in response to said sequence of input impulses.

8. Apparatus comprising a plurality of trigger circuits as defined in claim 6 connected in tandem whereby the first trigger circuit in the tandem connection is triggered for every input impulse, the second trigger circuit in the tandem connection is triggered for every fourth input impulse and the third trigger circuit in said tandem connection is triggered for every eighth impulse, and so on.

9. Apparatus comprising a plurality of trigger circuits as defined in claim 7 connected in tandem whereby said first trigger circuit is triggered on every input impulse, said second trigger circuit is triggered on every fourth impulse, and said third trigger circuit is triggered on every eighth input impulse, and so on.

JOHN T. BANGERT.

No references cited.